April 25, 1944.  C. G. ABERNATHY  2,347,233
COMPOSITE SURFACING MATERIALS AND METHOD OF APPLYING THE SAME
Filed Feb. 12, 1941
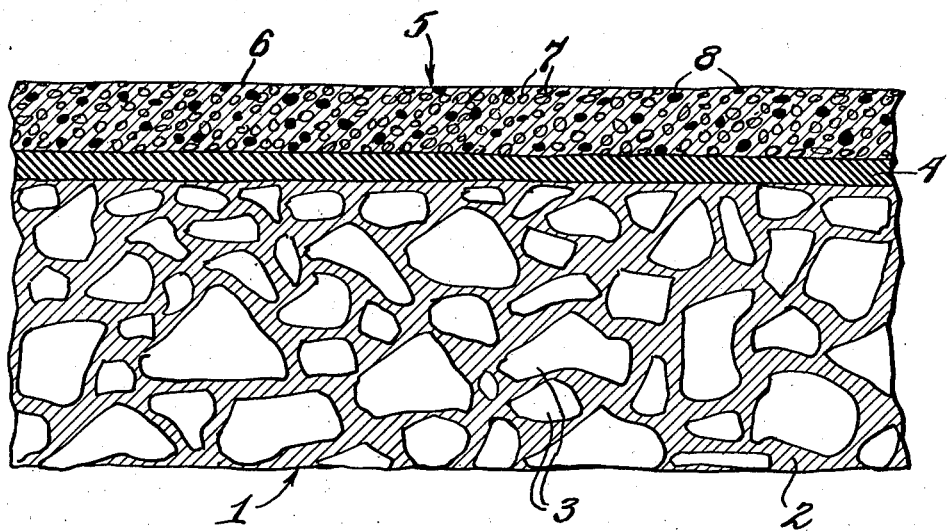
INVENTOR
Clyde G. Abernathy
BY
Popp and Popp
ATTORNEYS Patented Apr. 25, 1944

2,347,233

UNITED STATES PATENT OFFICE 2,347,233

COMPOSITE SURFACING MATERIAL AND METHOD OF APPLYING THE SAME

Clyde G. Abernathy, Hornell, N. Y., assignor of one-half to Archie L. Blades, Hornell, N. Y.

Application February 12, 1941, Serial No. 378,620

6 Claims. (Cl. 117—30)

This invention relates to composite surfacing materials and method of applying the same and more particularly to such materials which can be applied as a flexible layer for resurfacing roads, although the materials can also be applied to wall surfaces, roofs, and can be used as an interior finishing material.

One of the principal objects of the present invention is to provide such a material which is of low cost and can be readily applied to any type of foundation and which will stand up under conditions of severe and constant use both with vehicular traffic, such as when used to pave driveways or the areas around gasolene stations, and also with severe footwear, such as when used to pave tennis courts and sidewalks.

Another object of the invention is to provide such a material which can be produced in any color of any desired brilliance or delicacy, and in which the color is retained without fading, dulling or discoloring even when exposed to severe weathering or use.

Another object is to provide such surfacing materials in which inexpensive, inert aggregates can be employed and in which the voids between comparatively coarse aggregate, such as sand, can be in part filled by a fine aggregate, such as china clay.

Another object is to provide such material which can be applied in fine detail when desired, so as to permit detailed ornamentation or trademarks to be worked into the pavement.

Another purpose of the invention is to provide such material which is waterproof, thereby to protect the foundation, and will also withstand severe weathering without deterioration.

Another aim is to provide such a pavement which will not be deleteriously affected by gasolene, thereby rendering it unaffected by the spillage incident to the retail selling of gasolene.

Another purpose is to provide such a pavement which is firmly bonded to the foundation; which is flexible under all outdoor temperatures so that it can be applied to a yielding foundation without danger of cracking and also provides an agreeable surface to walk on and which will not creep or crack when applied to any usual foundation.

Another purpose is to provide such material which can be provided in any desired thickness and with any desired surface finish, that is, either rough so as to avoid the danger of skidding or slipping, or smooth and glossy so as to be readily cleaned, and can also be provided to have any desired degree of resilience and waterproofness.

Another purpose is to provide such a material which can be laid hot or cold and which does not require highly skilled labor in its application.

An important object is to also provide such material and method of laying the same which is both low in cost and in cost of application thereby to render it competitive in price with materials for similar purposes now in use.

Another object is to provide such material which is highly fire resistant and will not burn or char even when exposed to an intense flame.

Another purpose of the invention is to provide such surfacing material which will not become soft in hot weather when exposed to direct sunlight and which can be readily repaired, or resurfaced in another color if desired.

Another object is to provide such a surfacing material which is compacted during the application so that substantially all of the voids are completely filled with the binding material to provide a compact, firm, impervious and highly wear and weather resistant surfacing.

Another object of the invention is to provide such a material which can be used to provide traffic stripes on highways, such stripes being applied to designate traffic lanes or other information.

Another object is to provide such a material in which the aggregate can be composed of a light weight granular material, such as pulverized cork, which has low thermal conductivity thereby to permit of insulating oil and gasolene storage tanks and other reservoirs with the material.

Another object is to provide such surfacing material composed of aggregate and a resinous binder which can be preformed into sheets without the necessity of a backing, and can be sold in such sheet or in rolled form so as to be capable of being cemented to pavements, roofs, walls and the like.

Other objects and advantages of the invention will appear from the following detailed description.

The accompanying drawing is a vertical section through a pavement laid in accordance with my invention.

The invention is particularly directed to a colored surfacing material capable of being applied to any type of foundation or base and composed principally of a low cost, inert aggregate, such as sand, and a binder together with the coloring material and an agent to provide the desired degree of resilience. By "inert aggregrate" as used herein is meant an aggregate which does not chemically react with the other components of the surfacing material. To provide such a paving or surfacing material within a price range competitive with other common paving materials and having the property of withstanding weathering and also having the necessary wear resisting properties to withstand severe vehicular and foot traffic I have tested many materials in an effort to find both a suitable aggregate and a suitable binder. As the result of this research, I have found that by employing an alkyd resin as the binder for the aggregate, not only is it possible to provide the paving material in permanent colors of any desired brillancy or softness, and also having the necessary weather and wear resisting properties, but the surface also is unaffected by gasolene and can be made to be entirely waterproof to protect the base or foundation on which it is laid. Furthermore, the material is highly water resistant.

The alkyd resin which has been found to have the above properties when combined with an inert aggregate, such as sand, comprises an ester of a polybasic acid, a polyhydric alcohol and a modifying monobasic acid with or without other modifiers, such as rosin, phenol-aldehyde or substituted phenol-aldehyde condensation products. For example, the alkyd resin can be composed of phthalic or maleic anhydride, or an ester of a dibasic or tribasic acid prepared by the diene synthesis, glycerol, ethylene glycol, diethylene glycol or pentaerythritol and a fatty acid derived from linseed oil, soya bean oil, castor oil, or their esters. This particular class of resins has been found to have better adhesion both to the sand or other inert aggregate used and also to rubber or like materials which can be used to increase the resilience of the material when laid or to act as a sealing and cushioning layer for the base on which the material is laid. This class of resins also has been found to have superior wetting or coating properties for the sand or other aggregate, particularly as compared with asphalt which is commonly employed as a binder with sand and other inert aggregates in pavements. As compared with asphalt, the superior wetting properties of the alkyd resin appear to be due to the fact that the asphalts do not have polar groups and hence have good wetting properties only at very high temperatures. With the alkyd resins good wetting or coating of the aggregate is obtained at any temperature when the resin is in solution and at much lower temperatures than asphalt when the resin is not in solution.

The alkyd resin employed preferably is of the non-drying type as known to the protective coating industry, such properties being obtained by the use of a modifier, such as castor oil, not dehydrated castor oil. Such non-drying type of alkyd resin has permanent flexibility and plasticity which is desirable in a surfacing material. I have also found that aggregate coated with such non-drying alkyd resin can be reduced to a state where it can be shipped without danger of lumping or cohering of the coated particles in the shipping container and at the same time adhesion between the coated particles can be obtained by spreading the particles in the form of a layer upon a surface and rolling the layer.

My preferred ratios of sand or other aggregate, with or without color pigment, to the alkyd resin is a proportion which will produce a monomolecular layer of resin surrounding each particle of sand or other aggregate and color. For some uses it is desirable to have a slight deficiency of resin from that required to provide a monomolecular layer, such deficiency increasing the ease of handling and the workability of the mixed material.

As illustrative of specific compositions and methods of applying the materials to the surface to be paved or coated, the following examples of pavements actually applied and in service are given:

In the event that the foundation or base 1 is composed of bitumen or a mixture of bituminous materials 2 and an aggregate 3, it is desirable to first apply a sealing and adhesive layer 4 to the base, particularly if the alkyd resin of the paving material is applied in the form of a solution, the solvent of which attacks bitumen. This layer seals the base so as to prevent the solvent which may be used in applying the subsequently applied paving material from attacking the base; to prevent oils from working through from the base to the subsequently paved surface; to provide a layer having a strong bond to the bituminous base as well as to the subsequently applied paving material; can also be utilized to provide an impervious membrane and prevent the seepage of water or gasolene through to the bituminous base; and can also be utilized to increase the resilience of the finished surface by employing a resilient material as the component of this layer. I have found that powdered used rubber scrap worked or rolled into the surface of the bituminous base while the base is in a plastic state adequately prevents the oil of the bituminous base from working through to the finished surface and also has an excellent bond both with the base and with the subsequently applied paving materials. The rubber in powdered or pulverized form so applied also has been found to prevent solvents used in the alkyd resin paving material from attacking the bituminous base or foundation and this layer of powdered rubber worked into the surface of the bituminous base also has a marked influence in improving the resilience of the finished pavement.

Where it is impractical to so roll pulverized rubber into the surface of the bituminous base while plastic, as when resurfacing an old asphalt paved area of a gasolene station, a layer of an alkyd emulsion can be employed as the sealing and adhesive layer 4. In the emulsion form of the alkyd resin no solvents such as would attack the bituminous base or foundation are present, the presence of these solvents being the principal reason for working the powdered or pulverized rubber into the surface of the bituminous base. If increased resilience is desired in applying the material forming the subject of the invention to an old or hardened base of bituminous material, the layer 4 can be composed of rubber latex painted, sprayed or otherwise spread over the base or foundation before the mixture of an alkyd resin and aggregate is applied. This rubber latex comprises rubber in colloidal suspension in ammonia or the like and which dries to provide an impervious layer of rubber having excellent bond with the bituminous base and obtaining an excellent bond with the subsequently applied alkyd resin paving material. This rubber latex can be provided in any desired thickness to provide the desired resilience and both the latex and the alkyd resin emulsion provide an impervious sealing layer which prevents both water and gasolene from working through the pavement to the bituminous base.

The finishing layer 5 is composed of a binder 6 of an alkyd resin, color pigment and an inert aggregate 7. The inert aggregate 7 is preferably sand, although other fillers such as asbestine material in powdered or fibrous form, hair, barytes, crushed stone, clay, limestone dust or crushed slag can obviously be used. A combination of relatively coarse and fine aggregates, such as sand and china clay, can also be used, the china clay in part filling the voids between the particles of sand. To provide increased resilience in the paved surface I also have found it desirable to include, as a part of the aggregate, a substantial amount of powdered or pulverized rubber 8. For this purpose I have found that ground used scrap rubber is entirely satisfactory, such pulverized rubber being available as the waste from the tire retreading shops. While such scrap used rubber is satisfactory, it will be understood, of course, that new rubber scrap could be used and that also the synthetic rubbers, such as thiokol, neoprene or rubbers made of polymers of butadiene, in powdered form can be used. These synthetic rubbers are included in the definition of rubberlike materials as used herein.

Any color pigment can be used but where exposed to weathering and sunlight, the pigment is preferably selected for durability and light fastness, suitable pigments for this purpose being iron oxide, chrome oxide, chromate of lead or American vermilion. The finishing layer 5 can be built up with a succession of layers to provide a layer of any desired thickness or it can be laid as a single operation. The layer 5 can be laid hot or cold. The different methods of applying this layer which have been found to be satisfactory are as follows:

A layer of an alkyd resin is painted, sprayed or otherwise applied to the foundation or base or over the sealing and adhesive layer 4 if such layer has been provided. This layer of alkyd resin can be applied either hot or it can be applied cold in the form of a solution, the solvent and the amount of solvent being selected for quick drying qualities and to provide a layer of substantial thickness. The color pigment can be ground into this resin before it is applied, but I have found it more convenient to add the color pigment with the aggregate.

For this purpose the sand 7, color pigment and ground rubber 8 are applied as a mixture to the layer of alkyd resin while this layer is still tacky. The amount of color pigment in this mixture is determined by the strength and character of the color desired and the amount of ground rubber 8 employed can be as much as 10% by weight of the amount of sand employed without deleteriously affecting the wear resisting qualities of the pavement. The amount of powdered rubber used is determined, of course, by the resilience desired in the finished pavement. The mixture of sand, ground or powdered rubber and color pigment is sprinkled, broomed or otherwise spread over the coating of the alkyd resin before this coating has hardened and while it is still tacky. The sanded surface can then be rolled, if desired, to secure increased adhesion between the resin and the mixture of sand, color pigment and ground rubber and increased compactness. In the finished material, substantially all of the voids between the aggregate particles are filled with the alkyd resin, this compact form of the surfacing material being obtained by rolling. The excess of the mixture of sand, rubber and color pigment can then be swept off to insure uniformity in the thickness of the layer.

Following the application of the mixture of the sand, rubber and color pigment, the layer 5 can be built up to any desired thickness by the application of successive coatings, in alternation, of the alkyd resin and the mixture of sand, color pigment and pulverized rubber, these successive layers being applied in the same manner as the first coatings of resin and the mixture of sand, color pigment and pulverized rubber. The layer 5 can be finished by the application of a thin coating of the alkyd resin.

Instead of building up the layer 5 in a succession of coatings of resin and aggregate, applied in alternation as just described, this layer can be applied in a single operation by premixing the alkyd resin with the sand, color pigment and powdered rubber and applying this mixture to the base or foundation to provide a finished layer in one operation. When so applying the mixture of alkyd resin, sand, color pigment and pulverized rubber to provide the finished layer 5, the mixture can be laid hot by heating the mixture to the temperature required to maintain the alkyd resin in a liquid condition or it can be applied cold by incorporating a solvent in the alkyd resin before its mixture with the sand and pulverized rubber. With a hot mixture, the mixture is preferably prepared by heating the alkyd resin to about 300° F. and the sand or other aggregate to about 200–250° F.

As an alternative method of laying the layer 5 in a single operation, I have found that it is possible to premix the components, reduce the mixture to a state of dryness in which it will not lump or cohere when packed in shipping containers, but can be spread upon the base or foundation and rolled to provide a smooth wear resisting surface. In carrying out this process, the sand, pulverized rubber, color pigment and an alkyd resin, preferably of the type classified as non-drying by the protective coating industry, are mixed together, a solvent being used for the resin if mixed cold to insure thorough wetting or coating of the particles of sand and rubber. After being so mixed, the mass is dried, if a solvent is used. The mass is preferably agitated at the same time the drying is taking place so as to prevent the particles cohering with one another. After being reduced to a state where the particles will not cohere to one another, the mass can be shipped to the job and the loose resin coated particles spread upon the base or foundation and leveled or smoothed to provide the desired smooth surface. Upon then rolling the layer of resin coated particles, the pressure forces the resin coated particle into firm union with one another, the rolled layer of these resin coated particles being somewhat more porous than the layers applied by the other methods previously set forth, but otherwise being equally imprevious to moisture and having the same wear and weather resisting properties. If desired this rolled layer of resin coated particles can be coated with a liquid alkyd resin of any desired color to seal voids adjacent the surface.

As a further distinctly different method of laying the paving material forming the subject of the invention, the sand or other aggregate, pulverized rubber-like material and color pigment can be preformed into sheets which can be shipped to the job in rolls or otherwise and spread out and cemented to the foundation being surfaced. For this a cold mixture of alkyd resin dissolved in a solvent, sand or other aggregate, pulverized rubber and color pigment can be mixed and formed into sheet form and permitted to harden to provide a tough, flexible and resilient sheet. If desired the sheet can be made from a hot mixture by heating the alkyd resin to about 300° F., the sand to from 200°-250° F. and the resin, sand, pulverized rubber and color pigment mixed, formed into a sheet and permitted to harden. These sheets can also, if desired, have animal hair or asbestos fiber included in their composition for increased tensile strength but even without such fibrous fillers, it is unnecessary to provide a special backing for the sheets as the alkyd resin has sufficient inherent strength to render such backing unnecessary. The cement used to adhesively bond the sheets to the foundation can be a liquid alkyd resin, applied either hot, dissolved or in the form of an emulsion before the preformed sheets are applied, or rubber latex can be used as the bonding agent.

I have also found that the material forming the subject of the invention can be used to provide traffic stripes on highways, the material providing a stripe which has remarkable resistance to the constant wear and abrasion to which traffic stripes or other road lettering are subjected. In so providing traffic stripes the alkyd resin, sand and suitable coloring material can be applied either as a prepared mixture, or the resin and sand can be applied separately in the manner previously described. It has also been found practicable to employ finely divided mica as a part of the aggregate to impart light reflecting qualities to the traffic stripes.

It has also been found that the material forming the subject of the present invention can be used as a thermal insulating covering, particularly for exterior surfaces subjected to high temperature by the sun's heat. For such use, as for example, a coating for gasoline storage tanks and other reservoirs where the losses of the volatile products is very high, a light weight pulverized thermal insulating material such as pulverized cork is used as the aggregate with the alkyd resin as the binder. Cork of a size passing through a 24 mesh screen has been found entirely practical as the aggregate for such use and the alkyd resin and cork can either be applied separately or as a mixture to the exterior of the reservoir in the manner previously set forth.

From the foregoing it will be seen that the present invention provides a simple and inexpensive paving composition and method of applying the same whereby the covering or pavement can be produced in any color and has the qualities necessary to resist severe vehicular or foot traffic and severe weathering. The pavement can furthermore be rendered impervious to both water and gasolene, will not crack when exposed to low temperatures, will not ignite when exposed to a direct flame and can be firmly bonded to any type of base without creeping thereby rendering it usable for surfacing roofs and walls as well as pavements. The material can also be used as a thermal insulation coating by employing pulverized cork as the aggregate.

I claim as my invention:

1. A composite flexible surfacing material comprising a layer of finely divided rubber particles and a binder composed of an alkyd resin and a modifier rendering said alkyd resin nondrying.

2. A composite flexible surfacing material comprising a layer of an inert aggregate, finely divided rubber particles dispersed throughout the composition and a binder composed of an alkyd resin and a modifier rendering said alkyd resin nondrying.

3. A composite flexible surfacing material comprising a layer of an inert aggregate, finely divided rubber particles dispersed throughout the said aggregate, said rubber particles not exceeding 10% by weight of said inert aggregate and a binder composed of an alkyd resin and a modifier rendering said alkyd resin nondrying.

4. A composite flexible surfacing material comprising a layer of sand, finely divided rubber particles dispersed throughout the composition and a binder composed of an alkyd resin containing castor oil to render it non-drying.

5. In combination with a foundation of bituminous material, a sealing layer applied to said foundation and comprising finely divided rubber particles and a layer of a composite flexible surfacing material applied to said sealing layer and comprising an inert aggregate and a binder of an alkyd resin and a modifier rendering said alkyd resin nondrying.

6. The method of laying a composite surfacing material which comprises forming a base of plastic bituminous material, working a coating of finely divided rubber particles into the surface of said bituminous material and forming a layer of a surfacing material including an inert aggregate and a binder of an alkyd resin and a modifier rendering said alkyd resin nondrying on said coating of finely divided rubber particles.

CLYDE G. ABERNATHY.